United States Patent

[11] 3,568,808

| [72] | Inventor | Ravanell Hampton 1055 Cleveland, Kansas City, Kans. 66104 |
|---|---|---|
| [21] | Appl. No. | 807,272 |
| [22] | Filed | Mar. 14, 1969 |
| [45] | Patented | Mar. 9, 1971 |

[54] MOTOR AND BRAKE CONTROL ANTISKID DEVICE
4 Claims, 3 Drawing Figs.

[52] U.S. Cl. .................................................. 192/3, 123/198
[51] Int. Cl. ................................................... F16d 67/00
[50] Field of Search .......................................... 192/3, 3 (T)

[56] References Cited
UNITED STATES PATENTS

| 2,183,354 | 12/1939 | Lange | 192/3X |
| 2,338,244 | 1/1944 | Hayes | 192/3 |
| 2,537,444 | 1/1951 | Click | 192/3 |
| 2,630,871 | 3/1953 | Simpkins | 192/3X |
| 2,712,762 | 7/1955 | Pavlik et al. | 192/3TX |

Primary Examiner—Benjamin W. Wyche
Attorney—Berman, Davidson & Berman

ABSTRACT: An antiskid brake device including diaphragm means in communication with the fluid from the master brake cylinder and said diaphragm means having a biasing spring therein for normally urging a lever means in one direction, and a carburetor device with a fast idling cam wheel member, and said lever means being disposed to move said cam wheel member to a pulling position when the brakes are actuated and the brake fluid bears against the diaphragm means, so that the speed of the engine will be at a pulling speed when the brakes are applied to avoid skidding of the vehicle. The lever means is provided with means for adjusting its length including a telescoping arrangement and setscrew means. A rounded foot on the lever means fits a pulley on the carburetor wheel, so when the brakes are released, the foot will pull the wheel back to a closed position.

PATENTED MAR 9 1971

3,568,808

INVENTOR.
RAVANELL HAMPTON,
BY
Berman, Davidson & Berman
ATTORNEYS.

MOTOR AND BRAKE CONTROL ANTISKID DEVICE

The present invention relates to a brake device for automobiles and more particularly to a device that is attached to the side of a carburetor so that the engine will maintain a running speed when the brakes are applied.

It is an object of the present invention to provide a simple and effective antiskid device that is attached to the side of the carburetor of an internal combustion engine so that the idling cam wheel on the engine will on the engine will be moved to a position to keep the engine running at a slow driving speed when the brakes are applied to the vehicle, so that when the brakes are gradually released, then the engine will run at its normal idle speed.

It is yet a further object of the present invention to provide an antiskid carburetor brake for automobiles and vehicles and the like in which the car can be stopped in a quick and safe fashion, because the car will be under a pulling power when the brakes are applied.

It is yet another object of the present invention to provide a simple and economical antiskid brake device for attachment to the idling cam wheel of a carburetor which can be readily operatively connected to the hydraulic brake system of the master cylinder for actuation thereby.

It is another object of the present invention to provide an antiskid brake device that has adjustable linkage means for actuation of an idling cam wheel with a rounded foot thereon to fit a pulley member on the cam wheel and pull the wheel back to partly closed or a closed position when the brakes are released.

It is still a further object of the present invention to provide an antiskid brake device in which an adjustable lever means is provided with two sections including a telescoping member and setscrew means to vary the overall length thereof.

It is still a further object of the present invention to provide an antiskid brake device for a driver so that when he is going around a curve and has to apply the brake to slow down, it will prevent the car from turning over as he goes around the curve.

It is yet a further object of the present invention to provide an antiskid brake device which will be safe for stopping on slick and wet streets because the carburetor fast idling cam wheel is actuated by the application of the hydraulic brakes on the car to maintain a pulling speed when the brakes are applied.

Various other objects and advantages of the present invention will be readily apparent from the following detailed description, when considered in connection with the accompanying drawing forming a part hereof, and in which.

Figure 1:
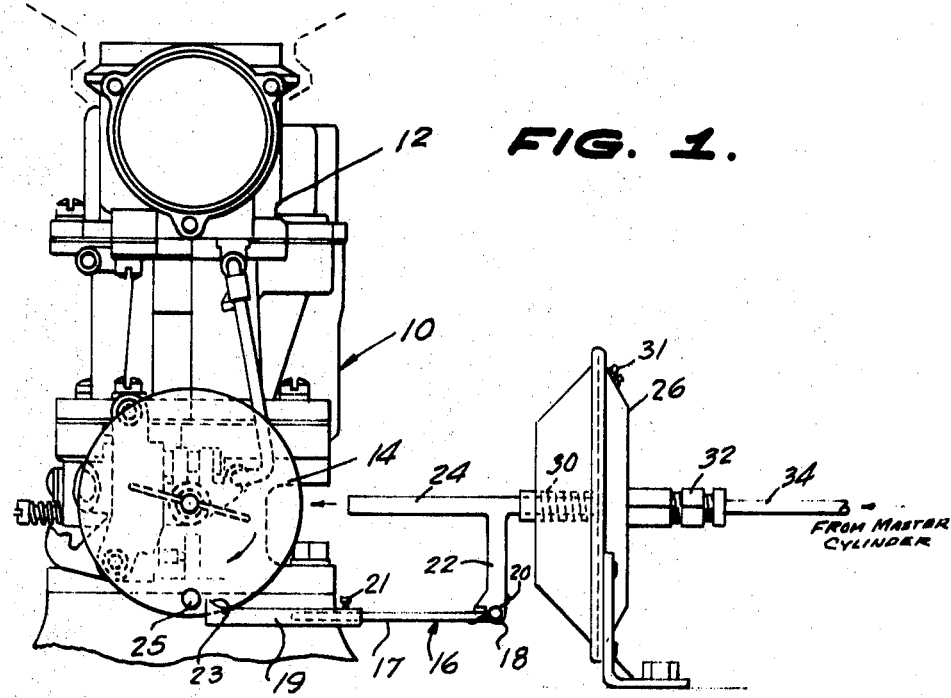
FIG. 1 is a side elevational view of the antiskid carburetor brake device of the present invention illustrating it positioned at idling speed when the brakes of the vehicle are not being applied.

Referring to the drawing, the reference numeral 10 generally designates an internal combustion engine having a carburetor generally designated 12, with a wheel 14 disposed on the fast idling cam rod. This wheel will admit more fuel or gasoline to the carburetor when the brakes of the vehicle are applied. The wheel is attached to a rod 16 connected thereto, which rod 16 has a pivot pin 18 and spring member 20 providing a linkage, which in turn is provided with a vertical rod 22 and a horizontal rod 24 operatively connected to a diaphragm device 26.

The rod 16 comprises a first rod section 17 and a second sleeve section 19 extending over the end of the section 17. A setscrew 21 in section 19 permits the two sections to be telescopically adjustable with each other to vary the overall length or dimension of rod 16.

A rounded foot 23 on the end of sleeve section 19 will engage the small pulley 25 on wheel 14.

Figure 2:
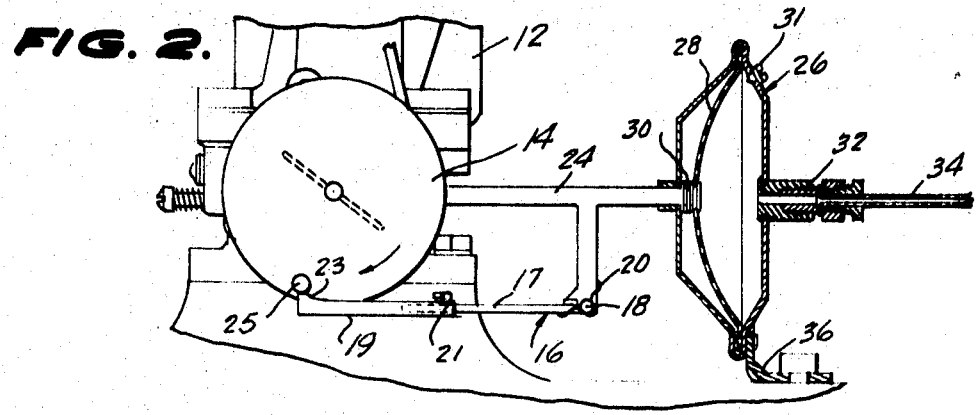
FIG. 2 is a view similar to FIG. 1, but illustrating the device set at a pulling speed when the brakes are being applied.
Figure 3:
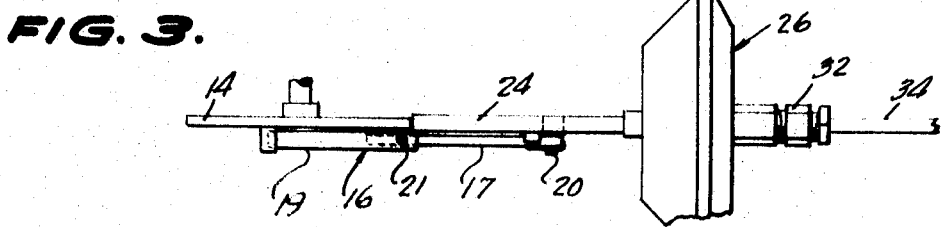
FIG. 3 is a top plan view of the device shown in FIGS. 1 and 2.

The diaphragm device 26, as best seen in FIG. 2, is of a rigid construction and is provided with a resilient diaphragm member 28 therein having a bleeder plug 31 connected to the rod 24. The rod 24 extends into the diaphragm device and has on the end thereof within the diaphragm device a biasing spring 30.

The other side of the diaphragm device 26 is provided with piping connections 32 in communication with a hydraulic or fluid supply line 34, which forms part of the braking system and is in communication with the master cylinder, not shown, of the braking system. The diaphragm device is rigidly connected to a support member 36.

When it is desired to apply the brakes, the brake pedal, not shown, which is conventional in any vehicle in present-day use, is actuated so that the master cylinder in turn will actuate the brakes. The master cylinder fluid will pass through the supply line 34 and into the diaphragm device 26 when the brakes are applied, so that the resilient diaphragm 28 will assume the position shown in FIG. 2. This will cause the linkage mechanism to rotate or turn the fast idling cam wheel 14 through section 19, foot 23 and pulley 25, which wheel 14 is operatively connected to the carburetor so as to admit gasoline or fuel thereto in order to keep the engine running at a pulling speed.

Thus, this operation will cause the engine to be maintained at a pulling speed when the brakes are applied and will prevent the car or vehicle, upon which the device is disposed, from skidding or turning over or in any way causing damage thereto by loss of control of the vehicle.

The device is somewhat on the order of stopping a train, wherein the throttle is left open with the brakes applied until the train comes almost to a stop, at which point the throttle is then shut off.

When the brake pedal is released, the fluid in the supply line 34 will decrease in pressure, so that the diaphragm 28 will return to its normal position when the brakes are not applied and the biasing spring 30 will cause the diaphragm to move to the right, and the spring will assume the position shown in FIG. 1 so that the linkage will permit the wheel 14 to return to its initial position. The rounded foot 23 will fit the pulley 25 on wheel 14 so when the brakes are released, foot 23 will pull the wheel 14 to a closed position.

Thus, the foregoing description shows that the present invention provides an economical and simple and effective antiskid carburetor device to prevent loss of control of a vehicle.

From the foregoing description, it will be apparent that various changes may be made in the form, location and relative arrangement of several parts without departing from the essential characteristics of the invention, and it is to be understood that this invention is not to be limited except by the scope of the appended claims.

I claim:

1. In a vehicle, a carburetor provided with a fast-idling cam wheel, an antiskid device comprising an abutment element on said cam wheel, a diaphragm device with a resilient diaphragm therein, a linkage mechanism extending into said diaphragm device, means on said linkage mechanism drivingly engageable with said abutment element on the fast-idling cam wheel, biasing means on said linkage mechanism to normally maintain said resilient diaphragm in a nonactuating position, and a brake system fluid pressure supply means on the vehicle in communication with said diaphragm device to apply pressure thereto when the brakes of the vehicle are applied, to prevent the vehicle from skidding, wherein said linkage mechanism includes a telescoping section and said abutment element comprises a pulley with which said telescoping section is engageable.

2. The device of claim 1 wherein said linkage mechanism extends into said diaphragm device on one side of said resilient diaphragm and said supply means communicates with said diaphragm device on the opposite side of said resilient diaphragm.

3. The device of claim 1 wherein said telescoping section comprises a rod section and a sleeve section over the end of the rod section with a setscrew member for rigidly securing said sections together.

4. The device of claim 3 wherein a rounded foot is provided on said sleeve section to engage said pulley to pull said wheel back to a partly closed position when the brakes are released.